(12) United States Patent
Anglin et al.

(10) Patent No.: US 10,228,887 B2
(45) Date of Patent: Mar. 12, 2019

(54) CONSIDERING INPUT/OUTPUT WORKLOAD AND SPACE USAGE AT A PLURALITY OF LOGICAL DEVICES TO SELECT ONE OF THE LOGICAL DEVICES TO USE TO STORE AN OBJECT

(71) Applicant: International Business Machines Corporation, Armonk, NY (US)

(72) Inventors: Matthew J. Anglin, Tucson, AZ (US); Arthur John Colvig, Beaverton, OR (US); Michael G. Sisco, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 14/849,572

(22) Filed: Sep. 9, 2015

(65) Prior Publication Data

US 2017/0068473 A1     Mar. 9, 2017

(51) Int. Cl.
*G06F 3/00* (2006.01)
*G06F 3/06* (2006.01)

(52) U.S. Cl.
CPC ............ *G06F 3/0689* (2013.01); *G06F 3/061* (2013.01); *G06F 3/0635* (2013.01)

(58) Field of Classification Search
CPC ...... G06F 11/30; G06F 3/0613; G06F 3/0631; G06F 9/5077; G06F 11/3433; G06F 3/061; G06F 3/0659; G06F 11/3065; G06F 9/50; G06F 9/5083; G06F 12/0868; G06F 3/044; G06F 2212/7202; G06F 2009/45579; G06F 12/02; G06F 12/00; G06F 3/0644; G06F 2212/1044; G06F 2212/7204
See application file for complete search history.

(56) References Cited

U.S. PATENT DOCUMENTS

| 4,771,375 | A | 9/1988 | Beglin et al. |
| 5,333,315 | A | 7/1994 | Saether et al. |
| 5,956,734 | A | 9/1999 | Schmuck et al. |
| 8,087,025 | B1 * | 12/2011 | Graupner ................ G06F 9/505 718/104 |
| 8,745,232 | B2 * | 6/2014 | Parthasarathy ......... H04L 51/14 707/609 |
| 9,378,136 | B1 * | 6/2016 | Martin ................ G06F 12/0246 |
| 9,395,937 | B1 | 7/2016 | Si et al. |
| 9,602,590 | B1 * | 3/2017 | Lu ........................... H04L 67/10 |

(Continued)

OTHER PUBLICATIONS

N. Joukov et al., "Increasing Distributed Storage Survivability with a Stackable RAID-like File System", dated 2005, Stony Brook University, Total 8 pages.

(Continued)

*Primary Examiner* — David X Yi
*Assistant Examiner* — Candice Rankin
(74) *Attorney, Agent, or Firm* — David W. Victor; Konrad, Raynes, Davda and Victor LLP

(57) ABSTRACT

Provided are a computer program product, system, and method for considering input/output workload and space usage at a plurality of logical devices to select one of the logical devices to use to store an object. A determination is made of a logical device to store the object based on workload scores for each of the logical devices indicating a level of read and write access of objects in the logical device and space usage of the logical devices. The object is written to the determined logical device.

17 Claims, 6 Drawing Sheets

(56) References Cited

U.S. PATENT DOCUMENTS

| | | | |
|---|---|---|---|
| 2014/0223012 A1* | 8/2014 | Agarwala | H04L 41/0836 |
| | | | 709/226 |
| 2014/0359226 A1* | 12/2014 | Pan | G06F 12/0873 |
| | | | 711/135 |
| 2015/0154044 A1 | 6/2015 | Blythe et al. | |
| 2015/0263978 A1 | 9/2015 | Olson et al. | |
| 2015/0269239 A1* | 9/2015 | Swift | G06F 17/30575 |
| | | | 707/610 |

OTHER PUBLICATIONS

J. Menon et al., "IBM Storage Tank—A Heterogeneous Scalable SAN File System" dated 2003, IBM Systems Journal, vol. 42, No. 2. Total 18 pages.

G. Weikum et al., "Dynamic File Allocation in Disk Arrays", dated 1991, ETH Zurich Department of Computer Science Information Systems—Databases, vol. 20. No. 2. ACM, Total 10 pages.

Xie et al. "Improving Mapreduce Performance Through Data Placement in Heterogeneous Hadoop Clusters", dated 2010, Parallel & Distributed Processing, Workshops and Phd Forum (IPDPSW), IEEE International Symposium on. IEEE, Total 9 pages.

US Patent Application, dated 07/24/18, for U.S. Appl. No. 16/044,465 (37.340C1), filed 07/24/18, invented by Matthew J. Anglin et. al, Total 32 pages_.

Dffice Action, dated 09/27/18, for U.S. Appl. No. 16/044,465 (37340C1), filed 07/24/18, invented by Matthew J. Anglin el 3l, Total 21 pages_.

List of Related Applications, pp. 2, dated Oct. 17, 2018.

* cited by examiner

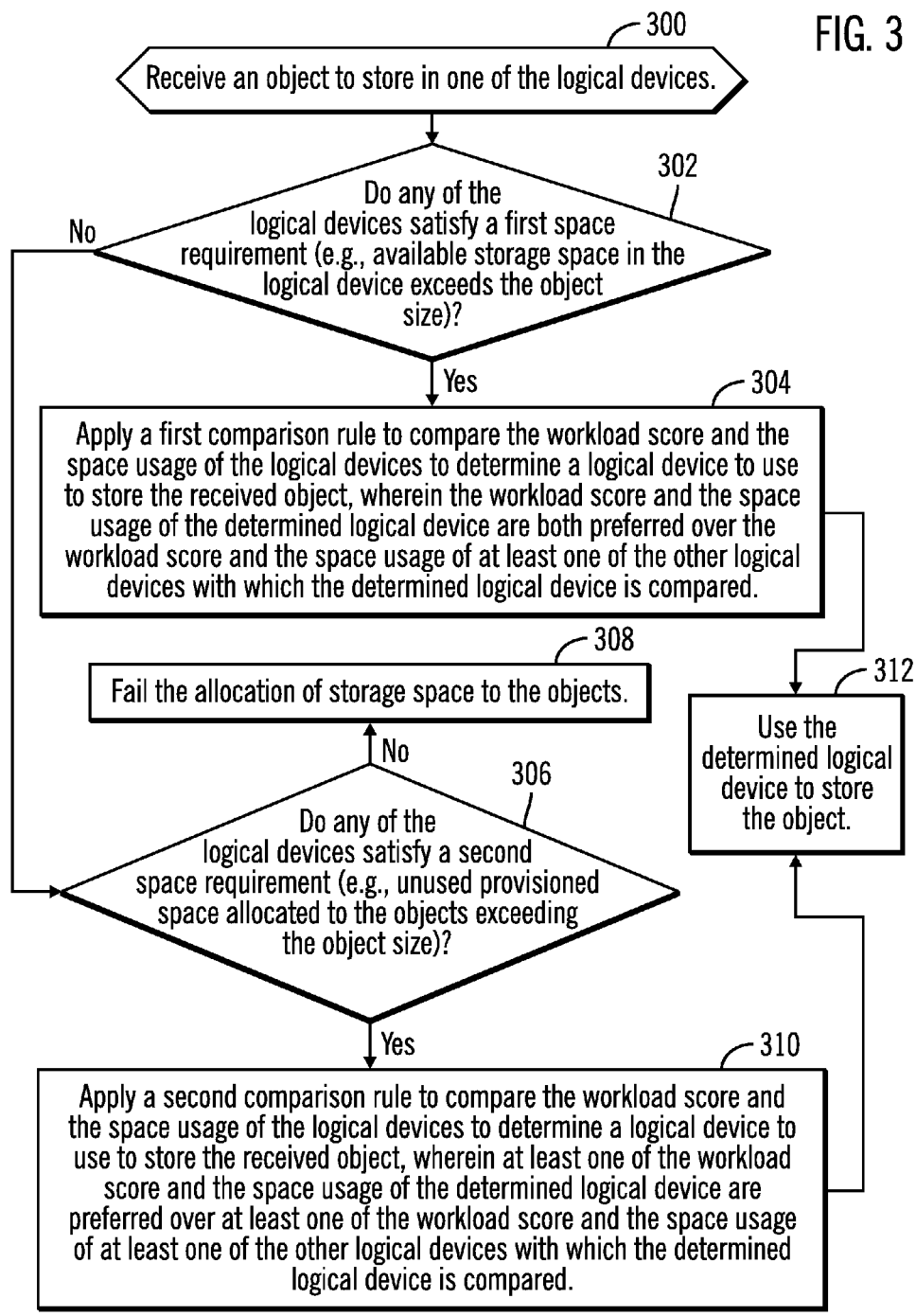

CONSIDERING INPUT/OUTPUT WORKLOAD AND SPACE USAGE AT A PLURALITY OF LOGICAL DEVICES TO SELECT ONE OF THE LOGICAL DEVICES TO USE TO STORE AN OBJECT

BACKGROUND OF THE INVENTION

1. Field of the Invention

The present invention relates to a computer program product, system, and method for considering input/output workload and space usage at a plurality of logical devices to select one of the logical devices to use to store an object.

2. Description of the Related Art

In storage environments having multiple storage devices, workload balancing may be used to select a storage device on which to store an object. Workload balancing is a well-established concept. For instance, Redundant Array of Independent Disk (RAID) controllers routinely balance workloads across disks. Multipath I/O (MPIO) agents alternate selection of Fibre Channel (FC) paths on which to send write data to balance the load on a Logical volume (LUN) or adapter ports.

There is a need in the art for improved techniques to select logical devices to use to store objects.

SUMMARY

Provided are a computer program product, system, and method for considering input/output workload and space usage at a plurality of logical devices to select one of the logical devices to use to store an object. A determination is made of a logical device to store the object based on workload scores for each of the logical devices indicating a level of read and write access of objects in the logical device and space usage of the logical devices. The object is written to the determined logical device.

BRIEF DESCRIPTION OF THE DRAWINGS

FIGS. 3, 4a, and 4b illustrate embodiments of operations to select a logical device to use to store a received object.

DETAILED DESCRIPTION

Current workload balancing techniques for selecting storage to use to store objects are I/O specific and may not address space utilization issues. Some prior art systems have a large single storage device and balance workload by selecting one of multiple paths to transmit the workload to the storage device. However, if the disk fails, all the data may be corrupted. Thus, to avoid a large scale failure, it may be preferable to divide a larger storage into multiple smaller units, so if one disk or device fails, data on the other disks is not affected. Thus to isolate the impact of a disk failure, multiple file systems are created and used in parallel.

However, creating multiple logical disks or file systems adds two balancing requirements, workload and space utilization. Described embodiments provide techniques to determine a logical device to store the object based on workload scores for each of the logical devices indicating a level of read and write access of objects in the logical devices and space usage of the logical devices. In considering space usage, both available free space not provisioned to objects and unused provisioned space allocated to objects but not used may be considered. Described embodiments determine a best fit logical device by considering the workload and available free space within objects and not allocated to any objects.

Figure 1:
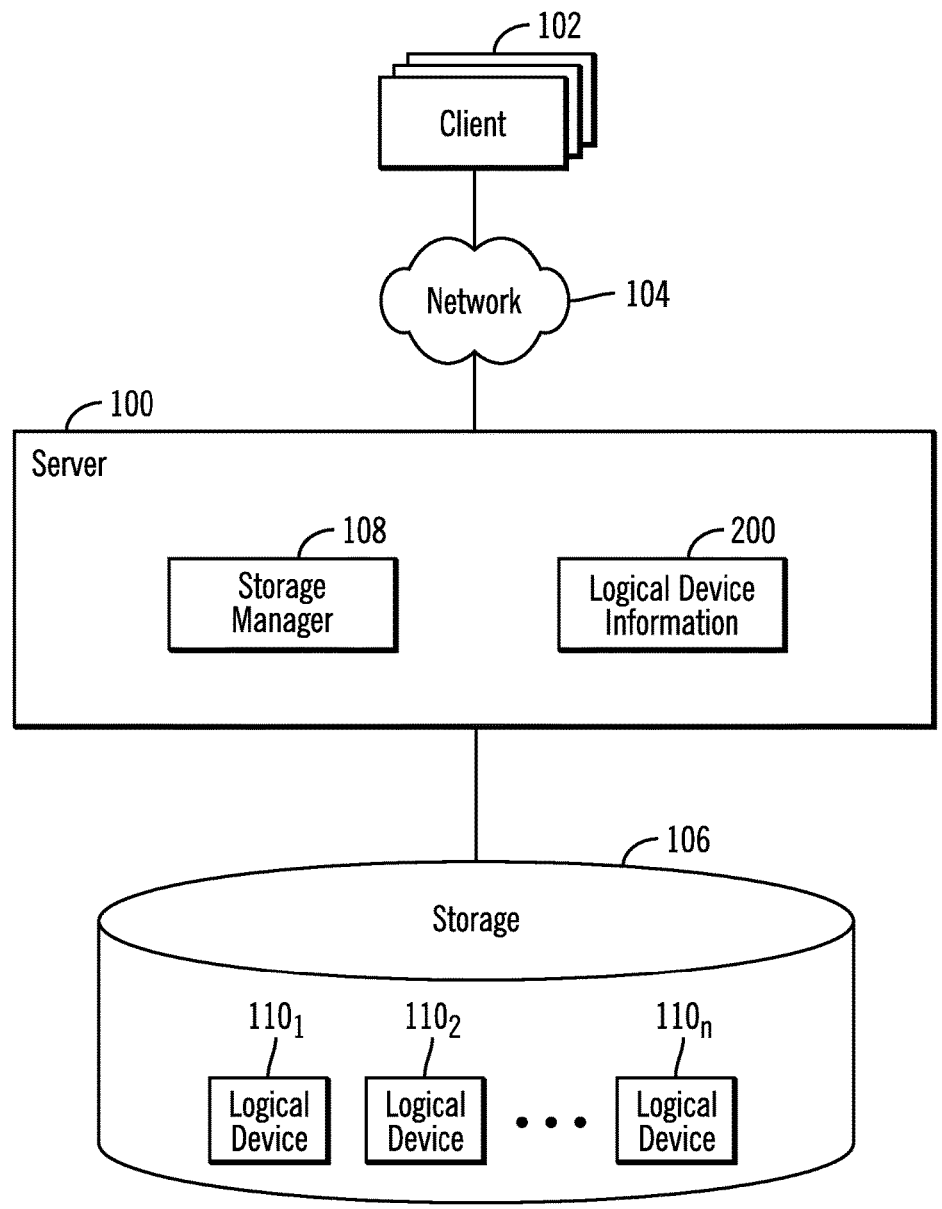
FIG. 1 illustrates an embodiment of a storage environment.

FIG. 1 illustrates an embodiment of a storage environment having a server 100 that communicates with one or more clients 102 over a network 104, where the clients 102 access data stored in a storage 106 through the server 100. The server 100 has a storage manager 108 that manages access to objects stored in the storage 106 and logical device information 200 having information on logical devices $110_1$, $110_2$ ... $110_n$ configured in the storage 106 in which client objects are stored. The logical devices $110_1$, $110_2$ ... $110_n$ may comprise logical units of storage configured in the physical storage devices that comprise the storage 106. For instance, the logical devices $110_1$, $110_2$ ... $110_n$ may comprise Logical Unit Numbers (LUNs), volumes, directories, logical disks, virtual volumes, virtual disks, file systems, or any other logical representation of an allocation of storage resources.

The storage manager 108 upon receiving a request from one of the clients 102 to store an object may select one of the logical devices $110_1$, $110_2$ ... $110_n$ to store the object in a manner that balances both Input/Output ("I/O") utilization across the logical devices $110_1$, $110_2$ ... $110_n$ and space utilization across the logical devices $110_1$, $110_2$ ... $110_n$ so they grow equally in size. Further, the storage manager 108 may also consider the amount of space allocated or provisioned to objects that is unused, unused provisioned space, and could be used to store objects. An object comprises any container of data, such as a file, image, container having multiple files, compressed file, archive container, multimedia file, database object, program, metadata, a document in a markup language, hierarchical presentation of data, binary large object (BLOB), etc.

Figure 2:
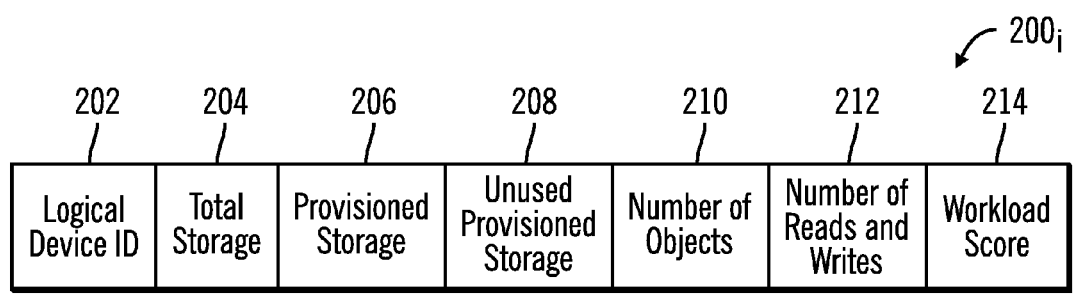
FIG. 2 illustrates an embodiment of logical device information.

FIG. 2 illustrates an embodiment of an instance of logical device information $200_i$ for a logical device $110_i$, and includes a logical device identifier (ID) 202; a total storage or total space, used and unused, allocated to the logical device; provisioned storage 206 comprising storage allocated to objects stored in the logical device $110_i$, unused provisioned storage 208 comprising that portion of provisioned storage allocated to objects in the logical device $110_i$, that is unused; a number of objects 210 stored in the logical device $110_i$; a number of reads and writes 212 that have been directed to the logical device $110_i$; and a workload score 214 calculated based on the number of reads and writes 212. The logical device information $110_i$ may be initialized first when initializing the logical device, and then updated as space is provisioned to objects and as read and write requests are received. Further, the workload score 214 may be periodically calculated based on the number of reads and writes 212 or calculated at the time of determining which logical device $110_1$, $110_2$ ... $110_n$ to use to store a new object or to use to storage objects being reassigned to logical devices as part of balancing the distribution of objects in the logical devices $110_1$, $110_2$ ... $110_n$.

In one embodiment, the number of reads and writes 212 may indicate a level of read and write access to the logical device $110i$. The level of read and write access may indicate the number of sessions accessing the logical device $110_i$ in read and write mode. Each of the clients 102 can have parallel read and/or write sessions and the server 100 can have internal read and/or write sessions to a logical device $110_i$. Thus, the number of reads and writes 212 (level of read and write access) in such case may reflect the number of read and write sessions, respectively, not actual I/O operations per second or session. In alternative embodiments, the number of reads and writes 212, i.e., level of read and write access, to a logical device $110_i$ may reflect the total number of reads and writes or IO operations per second or period from all sessions.

The workload score 214 may be calculated by weighting writes more heavily than reads. For instance, the workload score may be calculated as a sum of the reads and writes with the writes increased by a weighting factor or the reads reduced by a weighting factor. For certain storage devices, such as Sold State Drives (SSD), a write may cause more I/O workload than a read because a write involves additional allocation of storage space for garbage collection and write amplification. The weighting factor may be used to normalize reads and writes so their effect on the score is related to the amount of work they produce, so if writes require more work, than they are weighted more so that a unit of read and write added to the score reflects the same unit of work or I/O load on the system.

The server 100 and clients 102 communicate over a network 104, such as a local area network (LAN), storage area network (SAN), wide area network (WAN), cloud computing model, etc. In further embodiments, the server 100 and clients 102 may be connected by a direct cable connection or may comprise components on a single computer system platform, and may communicate over a bus or via memory.

The storage 106 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The storage manager 108 may comprise a software program in a memory executed by a processor of the server 100. In an alternative embodiment, some portion or all of the server 100 may be implemented in a hardware component, such as a dedicated integrated circuit, e.g., Application Specific Integrated Circuit (ASIC), expansion card, etc.

FIG. 3 illustrates an embodiment of operations performed by the storage manager 108 to select one of the logical devices $110_1, 110_2 \ldots 110_n$ to use to store an object. Upon receiving (at block 300) an object to store in one of the logical devices $110_1, 110_2 \ldots 110_n$, the storage manager 108 processes (at block 302) the logical devices $110_1, 110_2 \ldots 110_n$ to determine whether any of the logical devices $110_1, 110_2 \ldots 110_n$ satisfy a first space requirement (e.g., available storage space in the logical device exceeding the object size). If at least one of the logical devices $110_1, 110_2 \ldots 110_n$ has sufficient space, such as available unprovisioned space sufficient to store the object, then the storage manager 108 applies (at block 304) a first comparison rule to compare the workload score 214 and the space usage 204, 206 and/or 208 of the logical devices to determine a logical device $110_i$ to use to store the received object. In one embodiment, the workload score and the space usage of the determined logical device are both preferred over the workload score and the space usage of at least one of the other logical devices with which the determined logical device is compared.

In one embodiment, a preferred workload score indicates a lower workload level than a non-preferred workload score and a preferred space usage indicates more available free space than that of another logical device. In a further embodiment, one of the logical devices has a preferred space usage over that of another logical device when the logical device has both fewer objects and more free space than that of another logical device.

In one embodiment, the first comparison rule performs pairwise comparisons of the logical devices $110_1, 110_2 \ldots 110_n$. In each of the pairwise comparisons, the workload scores and space usages of the logical devices are compared to determine a best logical device having the preferred workload score and the preferred space usage score. In such embodiments, the determined logical device comprises the best logical device resulting from a last pairwise comparison. The best logical device resulting from one pairwise comparison is used in the next pairwise comparison until all the pairwise comparisons have been performed. The determined logical device comprises the best logical device resulting from the pairwise comparisons of the logical devices.

If (at block 302) no logical device $110_1, 110_2 \ldots 110_n$ has sufficient available unprovisioned space (not provisioned to any objects), then a determination is made (at block 306) whether any of the logical devices $110_1, 110_2 \ldots 110_n$ satisfy a second space requirement, such as having unused provisioned space allocated to the objects that exceeds a size of the received object). If (at block 306) there is no logical device $110_1, 110_2 \ldots 110_n$ satisfying the second space requirement, then the allocation of space from the logical devices to the object fails (at block 308).

If (at bock 306) at least one logical device $110_1, 110_2 \ldots 110_n$ satisfies the second space requirement, then the storage manager 108 applies (at block 310) a second comparison rule to compare the workload score 214 and the space usage 204-208 of the logical devices $110_1, 110_2 \ldots 110_n$ to determine a logical device to use to store the received object. In one embodiment, at least one of the workload score and the space usage of the determined logical device are preferred over at least one of the workload score and the space usage of at least one of the other logical devices with which the determined logical device is compared. The first and second comparison rules apply different criteria with respect to at least one of the workload score and the space usage.

In one embodiment, the second comparison rule performs pairwise comparisons of the logical devices. In each of the pairwise comparisons, selection is made of a best logical device comprising the logical device having a preferred workload score than a compared logical device when the compared logical devices both have unused space provisioned to objects exceeding a minimum amount of unused provisioned space. Further, selection may be made of the best logical device comprising the logical device having more unused space provisioned to objects when the logical devices in the pairwise comparison do not both have unused provisioned space exceeding the minimum amount of unused provisioned space. In such case, the determined logical device comprises the best logical device resulting from the pairwise comparisons of the logical devices under the first and second comparison rules.

The best logical device resulting from the first or second comparison is used in the next pairwise comparison until all the pairwise comparisons have been performed. The determined logical device comprises the best logical device resulting from the pairwise comparisons of the logical devices in the first (block 304) or second (block 310) comparison and is then used (at block 312) to store the received object.

With the described embodiments of FIG. 3, both the workload levels and unprovisioned and unused provisioned space are considered to determine a logical device to use to store the object to balance I/O levels and space usage factors to ensure that preference is made of underutilized logical devices and logical devices having more free space to balance space allocation.

Figure 4A:
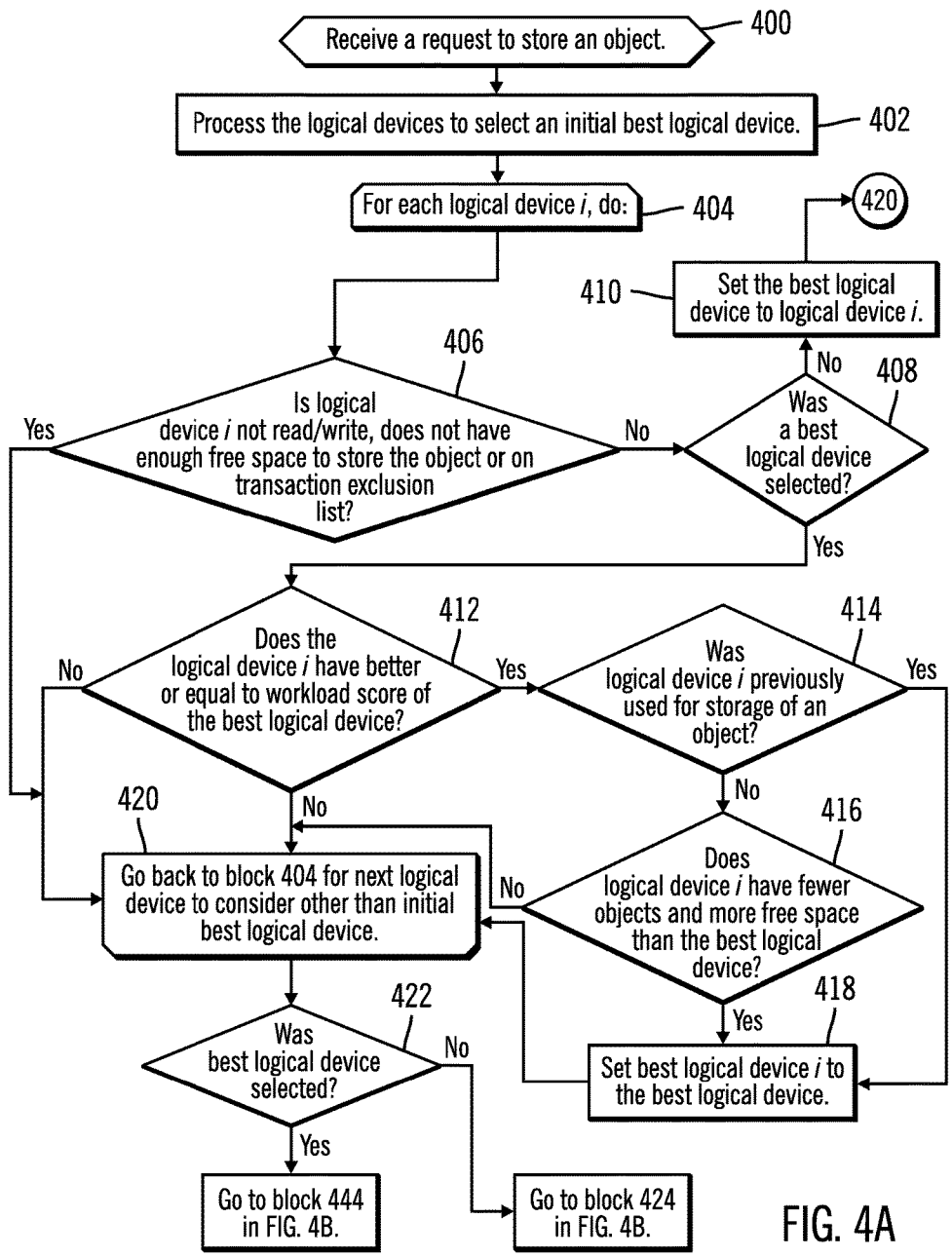
Figure 4B:
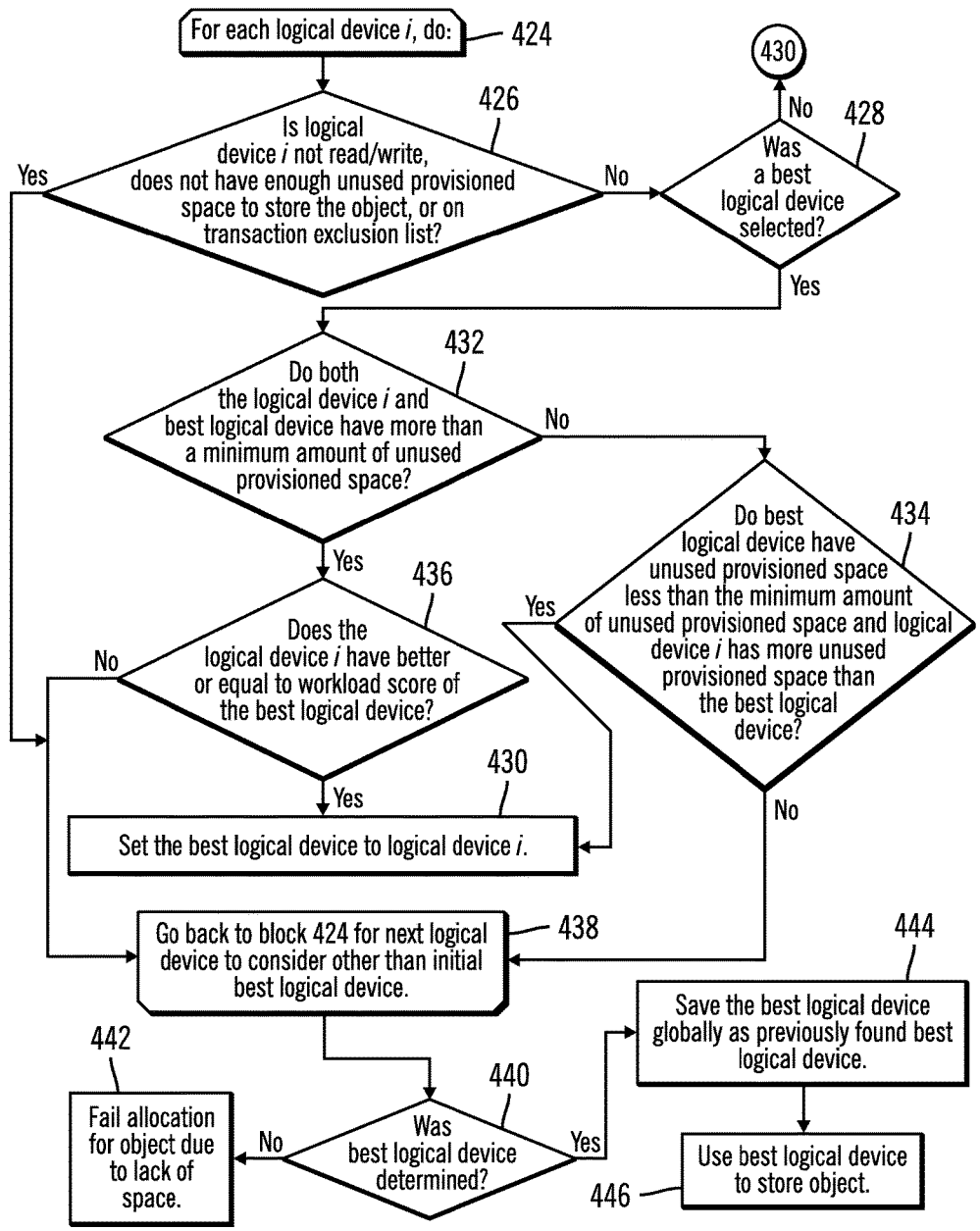

FIGS. 4a and 4b illustrate a further embodiment of operations performed by the storage manager 108 to select one of the logical devices $110_1$, $110_2$ ... $110_n$ to store a received object. Upon receiving (at block 400) an object to store in one of the logical devices $110_1$, $110_2$ ... $110_n$, the storage manager 108 may process (at block 402) the logical devices $110_1$, $110_2$ ... $110_n$ to select an initial best logical device. In one embodiment, an initial best logical device may be selected by looping through the logical devices $110_1$, $110_2$ ... $110_n$ to select a first of the logical devices $110_1$, $110_2$ ... $110_n$ having enough space to store the received object and that was a previously determined best logical device for a previously received object, or that matches a logical device most recently used for a pool of objects. In certain situations, a best logical device may not be initially selected, and control may proceed to block 404 for the comparison rules without selection of an initial best logical device.

A loop of operations is performed at blocks 404 through 420 for each logical device i of the logical devices $110_1$, $110_2$ ... $110_n$ that is not a selected initial best logical device if one was selected at block 404. A determination is made (at block 406) as to whether logical device i is to be excluded, such as is not read/write, does not have enough free space to store the object or on a transaction exclusion list. If (at block 406) the logical device i is to be excluded, then control proceeds to block 420 to skip logical device i and proceed to consider the next logical device until all logical devices are considered. If (at block 406) logical device i is not to be excluded, then if (at block 408) a best logical device was not selected (an initial or subsequently determined logical device), then the best logical device is set (at block 410) to logical device i. Control then proceeds to block 420 to consider a next logical device until all logical devices are considered. If (at block 408) a best logical device was selected, then the storage manager 108 determines (at block 412) whether logical device i has a better or equal workload score 214 than a previously determined best logical device, either the initial best logical device or a subsequently selected best logical device. If (at block 412) logical device i has a better workload score 214, i.e., preferred or lower workload level, and if (at block 414) logical device i was previously used for storage of an object or if (at block 416) logical device i has fewer objects and more free space than the best logical device, then the best logical device is set (at block 418) to logical device i.

If (at block 412) logical device i does not have a better workload score 214 or if (at block 414) logical device i was not previously used or did not have (at block 416) fewer objects and more free space, then logical device i is skipped and control proceeds (at block 420) back to block 404 to consider the next logical device.

After processing all logical devices $110_1$, $110_2$ ... $110_n$, if (at block 422) a best logical device was selected, then control proceeds to block 444 to use that best selected logical device to store the object. If (at block 422) a best logical device was not selected, then control proceeds to block 424 in FIG. 4b where a loop of operations at blocks 424-430 is performed to perform the second comparison to try to select a best logical device using different space usage characteristics than the first comparison, such as considering unused provisioned space allocated to objects, which could be used to store the new objects.

A loop of operations is performed at blocks 424 through 438 for each logical device i of the logical devices $110_1$, $110_2$ ... $110_n$ that is not a selected initial best logical device if one was selected at block 404. A determination is made (at block 426) as to whether logical device i is to be excluded, such as is not read/write, does not have enough unused provisioned space to store the object or is on a transaction exclusion list. If (at block 426) the logical device i is to be excluded, then control proceeds to block 438 to skip logical device i and proceed to consider the next logical device until all logical devices are considered. If (at block 426) logical device i is not to be excluded, then if (at block 428) a best logical device was not selected, then the best logical device is set (at block 430) to logical device i. Control then proceeds to block 438 to consider a next logical device until all logical devices are considered. If (at block 428) a best logical device was selected (initial or subsequently selected), then the storage manager 108 determines (at block 432) whether both logical device i and the current best logical device, either the initial best logical device or a previously selected best logical device, have more than a minimum amount of unused provisioned space, i.e., space provisioned to objects but not yet used by the object.

If (at block 432) both logical devices do not have more than the minimum amount of unused provisioned space from which the requested allocation for the received object can be satisfied, then the storage manager 108 determines (at block 434) whether the current best logical device has unused provisioned space less than the minimum amount of unused provisioned space and logical device i has more unused provisioned space than the best logical device, which would be greater than the minimum amount needed to store the object per the check at block 426. If (at block 434) the logical device i satisfies the space usage requirement, then the best logical device is set (at block 430) to logical device i.

If (at block 432) both logical devices have the minimum amount of unused provisioned space from which the requested allocation for the received object can be satisfied, then the storage manager 108 determines (at block 436) whether logical device i has a better or equal workload score 214 than the current determined best logical device, either the initial best logical device or a subsequently selected best logical device. If (at block 436) logical device i has a better workload score 214, then then the best logical device is set (at block 430) to logical device i. If (at block 436) logical device i does not have the better score, then the current best logical device remains unchanged and control proceeds to block 438 to consider any further logical devices not yet considered $110_1$, $110_2$ ... $110_n$.

After considering all logical devices $110_1$, $110_2$ ... $110_n$ in the first and second comparisons, if (at block 440) a best logical device was determined from the first comparison (at block 422) or from the second comparison (from block 438), then that determined best logical device is saved (at block 444) globally as the previously found best logical device and used (at block 446) to store the received object. If (at block 440) a best logical device was not selected as a result of both the first and second comparisons, then the allocation of the object fails (at block 442) due to lack of available space in any of the logical devices $110_1, 110_2 \ldots 110_n$.

Described embodiments provide techniques to determine a best logical device configured in storage to use to store a received object by balancing considerations of I/O workload at the logical devices and space usage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

Figure 5:
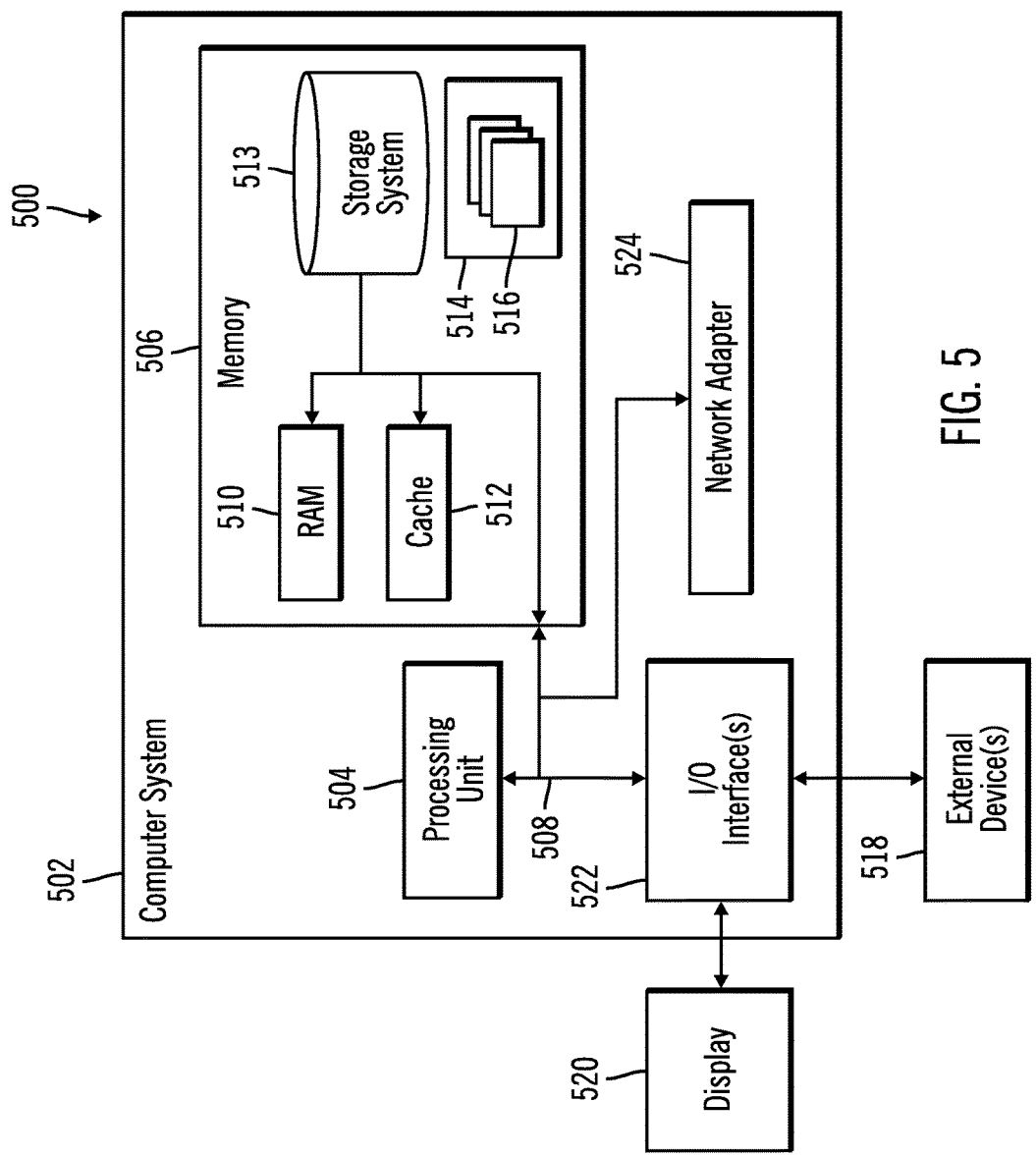
FIG. 5 illustrates a computing environment in which the components of FIG. 1 may be implemented.

The computational components of FIG. 1, including the server 100 and clients 102 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components may be used in conjunction with computer system/server 502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for selecting one of a plurality of logical devices configured in a storage to store an object, wherein the computer program product comprises at least one computer readable storage medium including computer readable code embodied therewith that when executed by a processor performs operations, the operations comprising:
   determining whether the logical devices have sufficient available unprovisioned space to store the object;
   in response to determining that a plurality of the logical devices have sufficient available unprovisioned space to store the object, selecting a logical device of the logical devices that have sufficient space to store the object based on workload scores of the logical devices, indicating a level of read and write access of objects that have been stored in the logical devices, and space usage scores of the logical devices, wherein the selected logical device has at least one of a preferred workload score-and a preferred space usage score of the workload scores and the space usage scores, respectively, of the logical devices;
   in response to determining that none of the logical devices have sufficient unprovisioned space to store the object, performing:
   selecting a logical device of at least two logical devices having a preferred workload score in response to at least two logical devices having unused space provisioned to objects exceeding a minimum amount of unused provisioned space; and
   selecting a logical device of the logical devices having more unused space of space provisioned to objects in response to no logical device of the logical devices having unused space provisioned to objects exceeding the minimum amount of unused provisioned space; and
   writing the object to the selected logical device.

2. The computer program product of claim 1, wherein a workload score of the workload scores for each logical device of the logical devices is calculated from a number of reads and writes to the logical device with writes weighted more than reads, wherein the number of reads and writes indicates a number of sessions accessing the logical device in read and/or write mode.

3. The computer program product of claim 1, wherein the selected logical device having sufficient available unprovisioned space has both the preferred workload score and the preferred space usage score based on pairwise comparisons of the logical devices.

4. The computer program product of claim 3, wherein the preferred workload score indicates a lower workload level than that of a compared workload score, and wherein the preferred space usage score indicates more available free space than that of a compared space usage score.

5. The computer program product of claim 4, wherein the preferred space usage score has both fewer objects and more free space than the compared space usage score.

6. The computer program product of claim 1, wherein the selected logical device having sufficient available unprovisioned space has both the preferred workload score and the preferred space usage score, wherein the selected logical device of the logical devices having sufficient available unprovisioned space comprises a logical device resulting from a last pairwise comparison, and wherein each pairwise comparison of the pairwise comparisons comprises:
   using the logical device resulting from the pairwise comparison in a next pairwise comparison until all the pairwise comparisons have been performed, wherein the selected logical device results from the pairwise comparisons involving the logical devices having the sufficient available unprovisioned space to store the object.

7. The computer program product of claim 1, wherein the determining whether the logical devices have sufficient unprovisioned space to store the object comprises a first space requirement wherein the selecting one of the logical devices having sufficient unused provisioned space determines whether any of the logical devices satisfy a second space requirement different from the first space requirement, wherein no logical device is selected in response to determining that none of the logical devices have sufficient unprovisioned space in response to determining that none of the logical devices having sufficient unused provisioned space satisfy the second space requirement.

8. The computer program product of claim 7, wherein the operations further comprise:
   failing an allocation of storage space in the logical devices to store the object in response to no logical device satisfying the first and second space requirements.

9. The computer program product of claim 7, wherein the first space requirement considers available free space in the logical device and wherein the second space requirement considers unused space of space provisioned to objects in the logical device.

10. A system for selecting one of a plurality of logical devices configured in a storage to store an object, comprising:
   a processor; and
   a computer readable storage medium including computer readable code embodied therewith that when executed by a processor performs operations, the operations comprising:
   determining whether the logical devices have sufficient available unprovisioned space to store the object;
   in response to determining that a plurality of the logical devices have sufficient available unprovisioned space to store the object, selecting a logical device of the logical devices that have sufficient space to store the object based on workload scores of the logical devices, indicating a level of read and write access of objects in the logical device, and space usage scores of the logical devices, wherein the selected logical device has at least one of a preferred workload score and a preferred space usage score of the workload scores and the space usage scores, respectively, of the logical devices; in response to determining that none of the logical devices have sufficient unprovisioned space to store the object, performing: selecting a logical device of at least two logical devices having a preferred workload score in response to at least two logical devices have unused space provisioned to objects exceeding a minimum amount of unused provisioned space; and selecting a logical device of the logical devices having more unused space of space provisioned to objects in response to no logical device of the logical devices having unused space provisioned to objects exceeding the minimum amount of unused provisioned space; and writing the object to the selected logical device.

11. The system of claim 10, wherein the selected logical device having sufficient available unprovisioned space has both the preferred workload score and the preferred space usage score based on pairwise comparisons of the logical devices.

12. The system of claim 10, wherein the selected logical device having sufficient available unprovisioned space has both the preferred workload score and the preferred space usage score, wherein the selected logical device of the logical devices having sufficient available unprovisioned space comprises a logical device resulting from a last pairwise comparison, wherein each pairwise comparison of the pairwise comparisons comprises:

using the logical device resulting from the pairwise comparison in a next pairwise comparison until all the pairwise comparisons have been performed, wherein the selected logical device results from the pairwise comparisons involving the logical devices having the sufficient available unprovisioned space to store the object.

13. The system of claim 10, wherein the determining whether the logical devices have sufficient unprovisioned space to store the object comprises a first space requirement wherein the selecting one of the logical devices having sufficient unused provisioned space determines whether any of the logical devices satisfy a second space requirement different from the first space requirement, wherein no logical device is selected in response to determining that none of the logical devices have sufficient unprovisioned space in response to determining that none of the logical devices satisfy the second space requirement.

14. A computer implemented method for selecting one of a plurality of logical devices configured in a storage to store an object, comprising:

determining whether the logical devices have sufficient available unprovisioned space to store the object;

in response to determining that a plurality of the logical devices have sufficient available unprovisioned space to store the object, selecting a logical device of the logical devices that have sufficient space to store the object based on workload scores of the logical devices, indicating a level of read and write access of objects that have been stored in the logical device, and space usage scores of the logical devices, wherein the selected logical device has at least one of a preferred workload score and preferred space usage score of the workload scores and the space usage scores, respectively, of the logical devices;

in response to determining that none of the logical devices have sufficient unprovisioned space to store the object, performing: selecting a logical device of at least two logical devices having a preferred workload score in response to at least two logical devices have unused space provisioned to objects exceeding a minimum amount of unused provisioned space; and selecting a logical device of the logical devices having more unused space of space provisioned to objects in response to no logical device of the logical devices having unused space provisioned to objects exceeding the minimum amount of unused provisioned space; and writing the object to the selected logical device.

15. The method of claim 14, wherein the selected logical device having sufficient available unprovisioned space has both the preferred workload score and the preferred space usage score of the based on pairwise comparisons of the logical devices.

16. The method of claim 14, wherein the selected logical device having sufficient available unprovisioned space has both the preferred workload score and the preferred space usage score, wherein the selected logical device comprises a logical device of the logical devices having sufficient available unprovisioned space resulting from a last pairwise comparison, wherein each pairwise comparison of the pairwise comparisons comprises:

using the logical device resulting from the pairwise comparison in a next pairwise comparison until all the pairwise comparisons have been performed, wherein the selected logical device results from the pairwise comparisons involving the logical devices having the sufficient available unprovisioned space to store the object.

17. The method of claim 14, wherein the determining whether the logical devices have sufficient unprovisioned space to store the object comprises a first space requirement wherein the selecting one of the logical devices having sufficient unused provisioned space determines whether any of the logical devices satisfy a second space requirement different from the first space requirement, wherein no logical device is selected in response to determining that none of the logical devices have sufficient unprovisioned space in response to determining that none of the logical devices satisfy the second space requirement.

* * * * *